(12) United States Patent
Bohnen (10) Patent No.: US 7,978,458 B2
(45) Date of Patent: Jul. 12, 2011

(54) LOCKING DEVICE AND WITHDRAWABLE RACK PROVIDED WITH SAID LOCKING DEVICE

(75) Inventor: Peter Bohnen, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 328 days.

(21) Appl. No.: 11/791,033

(22) PCT Filed: Nov. 16, 2005

(86) PCT No.: PCT/EP2005/056013
§ 371 (c)(1),
(2), (4) Date: May 18, 2007

(87) PCT Pub. No.: WO2006/053881
PCT Pub. Date: May 26, 2006

(65) Prior Publication Data
US 2008/0151475 A1 Jun. 26, 2008

(30) Foreign Application Priority Data
Nov. 19, 2004 (DE) .................. 10 2004 056 725

(51) Int. Cl.
*H02B 11/12* (2006.01)
*H01H 9/00* (2006.01)

(52) U.S. Cl. ........ 361/609; 361/607; 361/615; 361/616; 361/635; 361/653; 361/654; 200/50.21; 200/50.24

(58) Field of Classification Search .................. 361/607, 361/609, 615, 616, 635, 653, 654; 200/50.21, 200/50.24
See application file for complete search history.

(56) References Cited

U.S. PATENT DOCUMENTS

| | | | |
|---|---|---|---|
| 6,031,192 A | 2/2000 | Liebetruth | |
| 6,160,228 A * | 12/2000 | Gerbert-Gaillard et al. | 200/50.21 |
| 6,252,186 B1 * | 6/2001 | Liebetruth et al. | 200/43.01 |
| 6,472,620 B2 * | 10/2002 | Rane et al. | 200/50.26 |
| 6,838,626 B2 | 1/2005 | Deylitz et al. | |
| 7,022,923 B2 * | 4/2006 | Liebetruth | 200/50.21 |
| 7,034,233 B2 | 4/2006 | Deylitz et al. | |
| 2004/0112722 A1 | 6/2004 | Deylitz et al. | |

FOREIGN PATENT DOCUMENTS

| | | |
|---|---|---|
| DE | 44 20 580 C1 | 11/1995 |
| DE | 44 20 581 C1 | 11/1995 |
| DE | 202 02 917 U1 | 8/2002 |
| DE | 202 02 929 U1 | 10/2002 |
| DE | 202 02 927 U1 | 7/2003 |
| EP | 0 842 556 B1 | 2/1999 |

* cited by examiner

Primary Examiner — Zachary M Pape
(74) Attorney, Agent, or Firm — Harness, Dickey & Pierce, P.L.C.

(57) ABSTRACT

A locking device for an electric switch is disclosed which is movably guided in a withdrawable rack via an actuating shaft wherein the electric switch is placed in a preferred position, in particular in a disconnected position. In at least one embodiment, the locking device is movable from a release position in which the switch is displaceable in the withdrawable rack to a locking position in which the locking device blocks the switch displacement in a predetermined direction and the actuating shaft is actuated via an actuating crank. In order to safe the switch locking in the preferred position thereof, the locking device is movable to the locking position when the actuating crank actuation is blocked, only. The withdrawable rack, provided with the inventive locking device for the electric switch displaceable in the withdrawable rack via the actuating shaft, is also disclosed.

15 Claims, 8 Drawing Sheets

LOCKING DEVICE AND WITHDRAWABLE RACK PROVIDED WITH SAID LOCKING DEVICE

PRIORITY STATEMENT

This application is the national phase under 35 U.S.C. §371 of PCT International Application No. PCT/EP2005/056013 which has an International filing date of Nov. 16, 2005, which designated the United States of America and which claims priority on German Patent Application number 10 2004 056 725.5 filed Nov. 19, 2004, the entire contents of which are hereby incorporated herein by reference.

FIELD

Embodiments of the invention are generally related to the field of electrical switches and generally relate to a locking device for an electrical switch. For example, they may relate to a locking device which is guided displaceably in a withdrawable rack by way of an actuating shaft and which, with the switch located in a preferred position, in particular an isolating position, can be moved from a release position, in which the switch is displaceable in the withdrawable rack, into a locking position, the locking device in the locking position blocking a displacement of the switch in the withdrawable rack in a predetermined direction, and the actuating shaft being capable of being actuated via an actuating crank.

Embodiments of the invention also generally relate to a withdrawable rack with such a locking device.

BACKGROUND

A locking device and a withdrawable rack are known, for example, from the document EP 0 842 556 B1.

SUMMARY

At least one embodiment of the invention includes the locking of the switch in its preferred position to be even more reliable.

According to at least one embodiment of the invention, the locking device can only be moved into the locking position if the actuating crank is blocked against actuation. Such a design also prevents the actuation of the actuating crank. In an advantageous manner, the risk of damage to the mechanism of the locking device owing to the high leverage forces which act on the actuating shaft via the actuating crank is thus eliminated.

One example configuration of the novel locking device provides for a device for querying the position of the switch to be provided which, with the switch located in the preferred position, can only be moved from an open position into a blocking position if the actuating crank is blocked against actuation.

In a further example configuration, the locking device has the following elements:

- a device for blocking the actuating shaft, coupled to the device for querying the position of the switch, in order to block the displacement of the switch,
- an actuating element (for example, a blocking slide), which can be moved from a free position into a blocking position, in order to block the actuation of the actuating crank,
- a sensing device, which can be moved from a first position, which corresponds to the blocking position of the blocking slide, into a second position, which corresponds to the free position of the blocking slide, in order to sense the position of the blocking slide, and
- a first blocking device, which is coupled to the sensing device by way of a coupling section, in order to block the means for querying the position of the switch, the first blocking device only releasing the device for querying the position of the switch such that it can be moved into its blocking position if the blocking slide is located in its blocking position.

In a further example configuration, provision is made for the sensing device to be mounted on a carriage which can be displaced by way of the switch.

Furthermore, a restraining device can advantageously be provided which, with the switch removed from the withdrawable rack, keeps the sensing device in its first position, which corresponds to the blocking position of the blocking slide.

It is advantageous if the device for querying the position of the switch can be stopped in its blocking position. A locking cylinder, which is coupled to the device for querying the position of the switch by way of a cable pull, is preferably used for this purpose.

In order, when the switch has been removed once from the withdrawable rack, to prevent a switch from being inserted into the withdrawable rack again, a second blocking device is provided which, with the device for querying the position of the switch stopped in its blocking position and once the switch has been removed from the withdrawable rack, pivots into the movement path of the switch which points in the direction of the preferred position.

The novel locking device is preferably associated with the withdrawable rack and, for this purpose, is arranged beneath the electrical switch on the withdrawable rack, in particular by way of a bearing plate.

BRIEF DESCRIPTION OF THE DRAWINGS

A locking device designed in accordance with embodiments of the invention is illustrated in FIGS. 1 to 11, in which.

DETAILED DESCRIPTION OF THE EXAMPLE EMBODIMENTS

Figure 1:
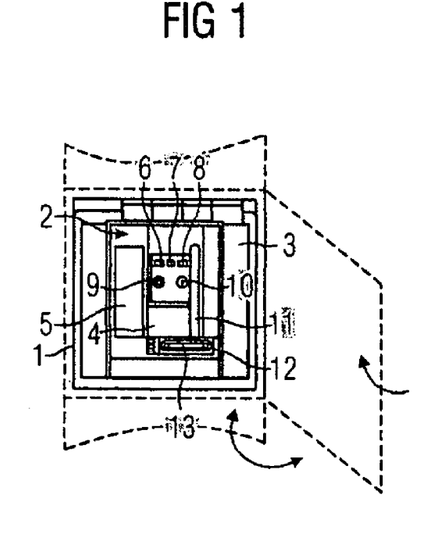
FIG. 1 shows a front side of a switchgear cell with a withdrawable rack in which a low-voltage circuit breaker is arranged.

As shown in FIG. 1, a withdrawable rack 1 is arranged in a switchgear cell of a switchgear cabinet or a switchgear assembly, a low-voltage circuit breaker 2 being arranged displaceably in a known manner in the withdrawable rack 1. The low-voltage circuit breaker 2, which has been inserted in the withdrawable rack 1, has a housing 3 for accommodating a switching pole assembly and a control panel 4, which is fixed to the front side of the housing 3 and forms the front side of the switch and by which a switching drive and further parts of the switch are covered. An overcurrent release 5, control and display elements 6 to 10, a manually operated winding lever 11 for tensioning a spring energy store of the switching drive and an actuating crank 13, which can be lowered into an accommodating pocket 12, for actuating an actuating shaft 14 of a traveling drive 15 are arranged on the control panel 4.

Figure 2:
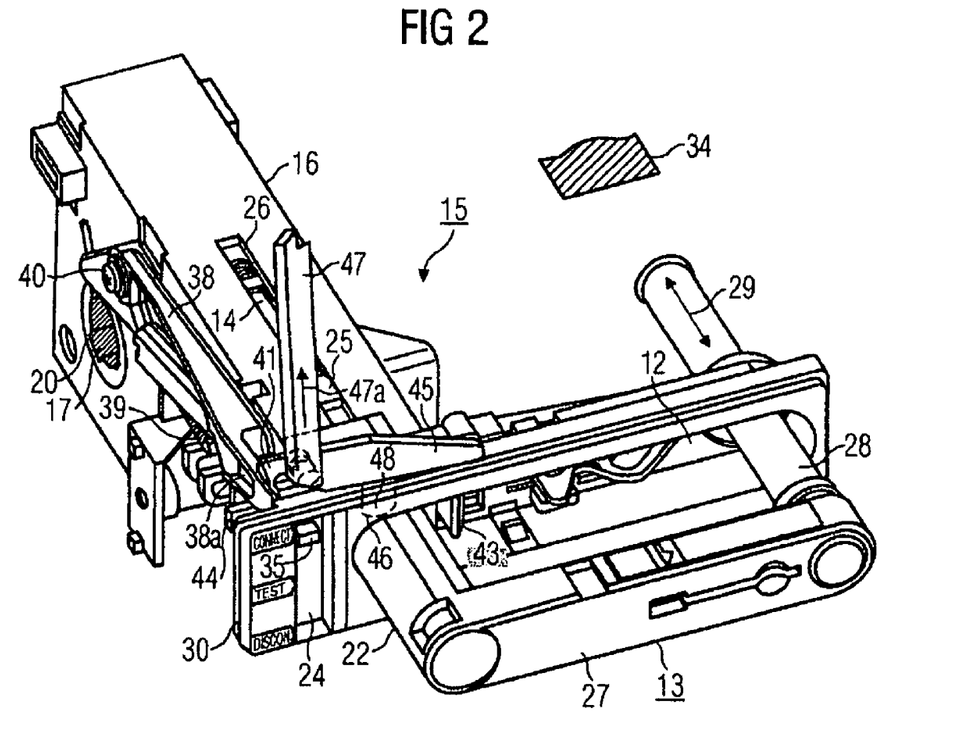
FIG. 2 shows a traveling drive of the low-voltage circuit breaker with a view of an actuating crank, which has been plugged onto an actuating shaft and can be blocked by way of an actuating element (blocking slide)

As shown in FIG. 2, the traveling drive 15 has a housing 16, which can expediently include two shell-like halves, between which gear mechanism parts and further components are arranged. A rotary movement, exerted by way of the actuating crank 13, is converted into a rotation of a traveling shaft 17 by way of the actuating shaft 14. For this purpose, a worm is arranged on the actuating shaft 14, which worm is in engagement with a gearwheel. The longitudinal axes of the actuating shaft 14 and the traveling shaft 17 are at right angles with respect to one another.

The traveling shaft 17 is not fixedly connected to the traveling drive 15, but is displaceable in a profiled opening 20 of the gearwheel which is matched to the profile of the traveling shaft 17. In this way, the traveling drive 15 can be used for circuit breakers of different sizes and is not tied to a specific position along the traveling shaft 17. Traveling cranks 21 (cf. FIG. 4) are fitted in a known manner to the ends of the traveling shaft 17, which traveling cranks 21 interact with stationary parts, for example in the way shown schematically in DE 44 20 580 C1 or DE 44 20 581 C1 (in each case in FIG. 1). Likewise not illustrated is the fixing of the traveling drive 15 to a circuit breaker, since this is well known to a person skilled in the art.

As has already been mentioned, an actuating crank 13 is used for rotating the actuating shaft 14 which is mounted in the housing 16, which actuating crank 13, in contrast to the other known traveling drives (cf. DE 44 20 580 C1 and DE 44 20 581 C1, mentioned), cannot be removed from the actuating shaft 14, but is part of the traveling drive 15. The actuating crank 13 has a hollow shank 22, which is coupled in a rotationally locked fashion to a free end of the actuating shaft 14 and can be displaced on the actuating shaft 14.

The hollow shank 22 bears a guide pin 25, which engages in a guide groove 26 provided on the housing 16. Since the guide groove 26 is matched to the guide pin 25, the shank 22 can be displaced along the guide groove 26, but without any possibility of rotation. This is only enabled when the shank 22 has been pulled out completely towards the front, where the guide groove 26 opens out into an annular groove in the housing 16. "Annular groove" is in this context understood to mean differently shaped cutouts of the housing 16 which make free rotation of the shank 22 possible.

In addition to the shank 22, the actuating crank 13 includes a crank arm 27, which is connected to the shank 22 (or is produced integrally with said shank) and at whose end an opening for accommodating a grip piece 28 is located. The grip piece 28 can be displaced in the mentioned opening in the direction of an arrow 29 parallel to the shank 22 and can be moved from the inserted rest position shown in FIG. 3 into a withdrawn working position by the user.

In the rest position, the actuating crank 13 therefore needs to be accommodated in the accommodating pocket 12 such that it is lowered so as to be flush. The accommodating pocket 12 belongs to a control panel insert 30 (cf. FIGS. 1 and 2), which is arranged on the lower edge of the control panel 4 of the circuit breaker 2. When the actuating crank 13 is inserted into its rest position, an end face 31 (cf. FIG. 3) at the end of the shank 22 comes to bear against a supporting ring 32, which is loaded by a stop spring 33. The stop spring 33 is a helical compression spring, which rests on the actuating shaft 14. Then, the user pushes the grip piece 28 through the opening located in the crank arm 27 until it is in a position which is flush with the crank arm 27. The inner end of the grip piece 28 then bears against a stop 34.

In this inserted rest position, the user in fact has no possible way of gripping the crank arm because the contour of the accommodating pocket 12 is matched to the crank arm 27 with the shank 22 and the grip piece 28. Nevertheless, if required quick access is ensured. This takes place by virtue of the fact that the depth of the accommodating pocket is dimensioned such that it is larger by a certain extent than is required to accommodate said parts. The user can therefore push the crank arm 27 slightly into the accommodating pocket, counter to the force of the stop spring 33. However, the grip piece 28, owing to the fact that it bears against the fixed stop 34, cannot take part in this movement and now protrudes from the crank arm 27 by the same amount. The user can now pull out the grip piece 28 and then the crank arm 27 with the shank 22.

In a similar way to in the case of known traveling drives, arranged alongside the actuating crank 13 is a display window 24, in which a display 35 for the operational position of the circuit breaker in its withdrawable rack can be seen. These positions—operating position, test position and isolating position—relate in a known manner to the relative positions of movable main isolating contacts and auxiliary isolating contacts and therefore, with a given arrangement of these isolating contacts, to the position of the circuit breaker 2 in the associated withdrawable rack 1. Owing to the fact that the traveling cranks 21 (cf. FIG. 4) at the ends of the traveling shaft 17 engage in a stationary guide of the withdrawable rack 1, the angular position of the gearwheel therefore forms a reliable feature for the mentioned positions.

For the purposes of the display device, a control cam is therefore arranged at an end side of the gearwheel (not shown), against which control cam a sensing pin of a two-armed display lever 38 bears under the action of a tension spring 39. The display lever 38, which can be pivoted about a bearing screw 40, therefore moves the control cam into a position of the display 35 which can be perceived by the user in the display window 24 (cf. FIG. 2). It is essential here that the user, when actuating the actuating crank 13, can easily identify when the mentioned positions have been reached. For this purpose, the control cam is provided with sections having different slopes, which are designed such that the display 35 assumes an intermediate position in each case shortly after one of the mentioned positions has been left and then indicates the following position shortly before this position is reached. Owing to the bearing screw 40 of the display lever 38 which is positioned relatively close to the control cam, relatively small deflections are converted into easily visible movements of the display 35 in the display window 24.

Owing to a latching slide 41, which is loaded by way of a prestressing spring, the shank 22 is protected against being unintentionally inserted into the housing 16. The latching slide 41 is guided in the front part of the housing 16 and likewise interacts with the end face 31 at the inner end of the shank 22. When the shank 22 is pulled out into its working position, the latching slide 41 springs behind the end face 31 and therefore blocks the insertion of the shank 22. In order to release the shank 22 such that it can be inserted, an actuating tab 43 is available to the user which is arranged such that it protrudes into the accommodating pocket 12 and therefore is only accessible when the actuating crank 13 has been pulled out.

The latching slide 41 has an additional function in the central position (test position) of the traveling drive 15. In contrast to the operating position and isolating position, this does not manifest itself for the user by a noticeable resistance at the actuating crank owing to end stops having been reached. In order that, nevertheless, the user can insert the actuating crank 13 only when the test position has been reached precisely, the latching slide 41 is provided with a tongue 44, which emerges laterally at the housing 16 if the actuating tab 43 is operated and a window opening 38a, which is arranged in the display lever 38, is opposite the tongue 44.

In order to deny the user access to the actuating crank 13, when the crank arm 27 has been lowered into the accommodating pocket 12, the shank 22 of the actuating shaft can be fixed axially by a first blocking mechanism. This takes place owing to a first blocking element in the form of a blocking lever 45 in conjunction with a blocking groove 46, which is arranged in the shank 22 of the actuating crank and is delimited in the axial direction of the switch. In this case, the blocking lever 45 is correspondingly connected to a first actuating element in the form of a blocking slide 47, as is described in DE 44 20 580 C1. If the preconditions exist for the traveling drive 15 to be capable of being actuated without any risk to the user, the blocking lever 45 is lifted by the blocking slide 47 corresponding to an arrow 47a shown in FIG. 2, a blocking tab 48 of the blocking lever 45 being pulled out of the blocking groove 46 of the shank 22. Conversely, it is only possible to switch the circuit breaker 2 on when the actuating crank 13 has again been inserted into its rest position in the accommodating pocket 12 and therefore the blocking tab 48 on the blocking lever 45 can again enter the blocking groove 46.

Figure 3:
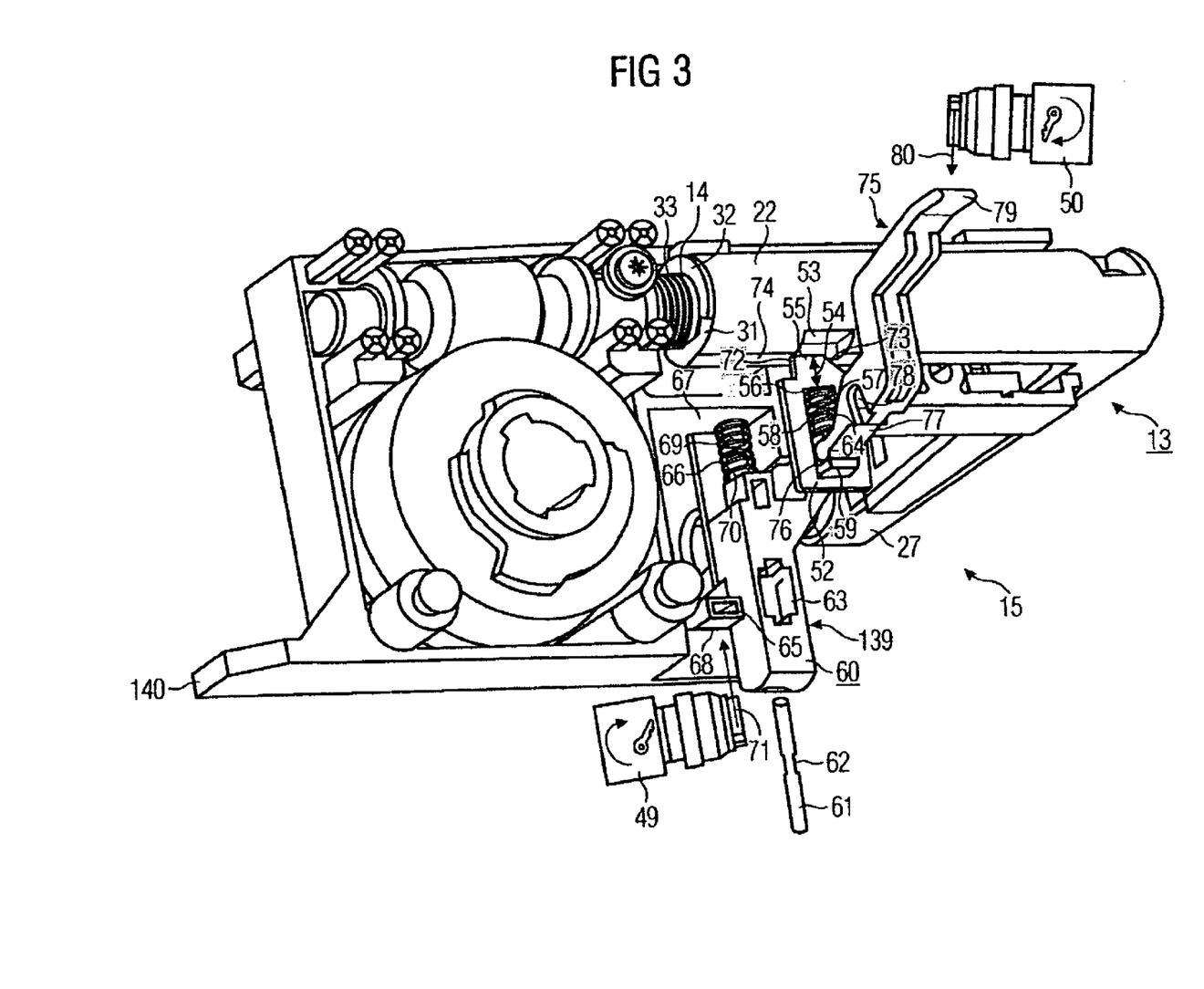
FIG. 3 shows the traveling drive shown in FIG. 2 with a view of a blocking pawl, by which the actuating shaft can be stopped.

As shown in FIG. 3, the traveling drive 15 has a second blocking mechanism for blocking the actuation of the actuating shaft 14. This second blocking mechanism serves the purpose of preventing a displacement of the switch in the withdrawable rack by way of cylinder locks 49, 50. This second blocking mechanism also fixes the shank 22 of the actuating crank 13 in its axial direction 29 if the second blocking mechanism is activated in blocking fashion and if the crank arm 27 of the actuating crank has been lowered into the accommodating pocket 12. This takes place by way of a second blocking element, in the form of a blocking pawl 52, in conjunction with a second blocking groove 53, which is arranged in the shank 22 of the actuating crank and is likewise delimited in the axial direction 29 of the shank 22. The blocking pawl 52 is in the form of a stamped metal part and is guided displaceably on stop faces on the traveling drive 15 in the direction of the arrow 54 at right angles to the shank 22.

In addition to a blocking tab 55, which is integrally formed on the side facing the shank 22, it has a window-like opening 56, from one of whose inner walls a first retaining pin 57, which runs parallel to the displacement direction 54 of the blocking pawl, for a pretensioning spring 58 is integrally formed. A first arm 59 of a second actuating element 60, which is held on the traveling drive displaceably in the displacement direction 54 of the blocking pawl, protrudes into the window-like opening 56 of the blocking pawl 52.

A cylindrical pin 61, which passes through inner walls, which run at right angles to the displacement direction 54, of the actuating element 60 and fixing lugs (opposite these walls) of the traveling drive in the region of corresponding through-holes, is used for holding this second actuating element 60 on the traveling drive 15. In order to axially fix the inserted pin, the pin has a tapered section 62, into which a sprung tab 63 of the actuating element 60 snaps. In order to dismantle the actuating element 60, this tab 63 can be lifted out of the tapered section 62 of the pin 61 by way of a screwdriver or a comparably narrow tool and the pin can therefore be released such that it can be pulled out.

A second retaining pin 64 for the pretensioning spring 58 is integrally formed on the first arm 59 of the second actuating element 60. A second arm 65 of the actuating element 60, under the force of a resetting spring 66, which is supported on a first supporting face 67 of one of the housing halves of the traveling drive, bears against a second supporting face 68 of this housing half. In order to guide the resetting spring 66, one supporting face 67 and the actuating element 60 are provided with in each case one retaining pin 69, 70. A first cylinder lock 49 (illustrated schematically) is used for controlling the actuating element 60. When this first cylinder lock 49 is closed, a tab (not illustrated) acts in the direction of the arrow 71 on the second arm 65 and displaces the actuating element 60 and the blocking pawl 52, which is coupled to the actuating element 60 via the pretensioning spring 58, counter to the force of the resetting spring 66 from an OFF position into an ON position in the direction of the shank 22 of the actuating crank. When the shank 22 has been inserted completely, i.e. when the crank arm 27 has been lowered into its accommodating pocket, the second blocking groove 53 of the shank 22 is opposite the blocking tab 55 of the blocking pawl 52, with the result that said blocking tab 55 can enter the blocking groove 53. When attempting to pull the crank arm 27 out of the accommodating pocket 12, one side face of the blocking groove 53 comes to bear against a stop face 72 of the blocking tab 55 and therefore indicates to the operating personnel that blocking of the traveling drive is taking place.

In this case, even a slight resistance is sufficient for indicating blocking of the traveling drive. The second actuating element 60, in contrast to the first actuating element 47 (blocking slide) of the first blocking mechanism, can be displaced from its OFF position into its ON position even when the crank arm 27 has not or has not yet been completely lowered into the accommodating pocket 12. With the shank 22 completely pulled out, the blocking pawl 52 is likewise raised when the actuating element 60 is raised and therefore protrudes into the movement path of the shank 22. When the shank is pushed in, the end face 31 of the shank 22 slides over a sliding face 73 of the blocking tab 55 of the blocking pawl and pushes the blocking pawl 52, counter to the force of the pretensioning spring 58, out of the movement path of the shank. Then, the blocking tab 55 slides along a flattened outer section 74 of the shank until it latches into the blocking groove 53.

For the alternative actuation of the blocking pawl 52, the second actuating element is coupled to a third actuating element 75 in the form of a two-armed lever. For the coupling process, the second actuating element 60 has a U-shaped cutout 76 at the free end of its first arm 59, a first arm 77 of the two-armed lever engaging in said cutout 76. This two-armed lever is capable of rotating about a stationary bearing screw (not illustrated), which passes through a hole 78 of the third actuating element 75. The second lever arm 79 of the third actuating element 75 can be actuated by way of a pawl of the cylinder lock 50 in the direction of the arrow 80.

Figure 4:
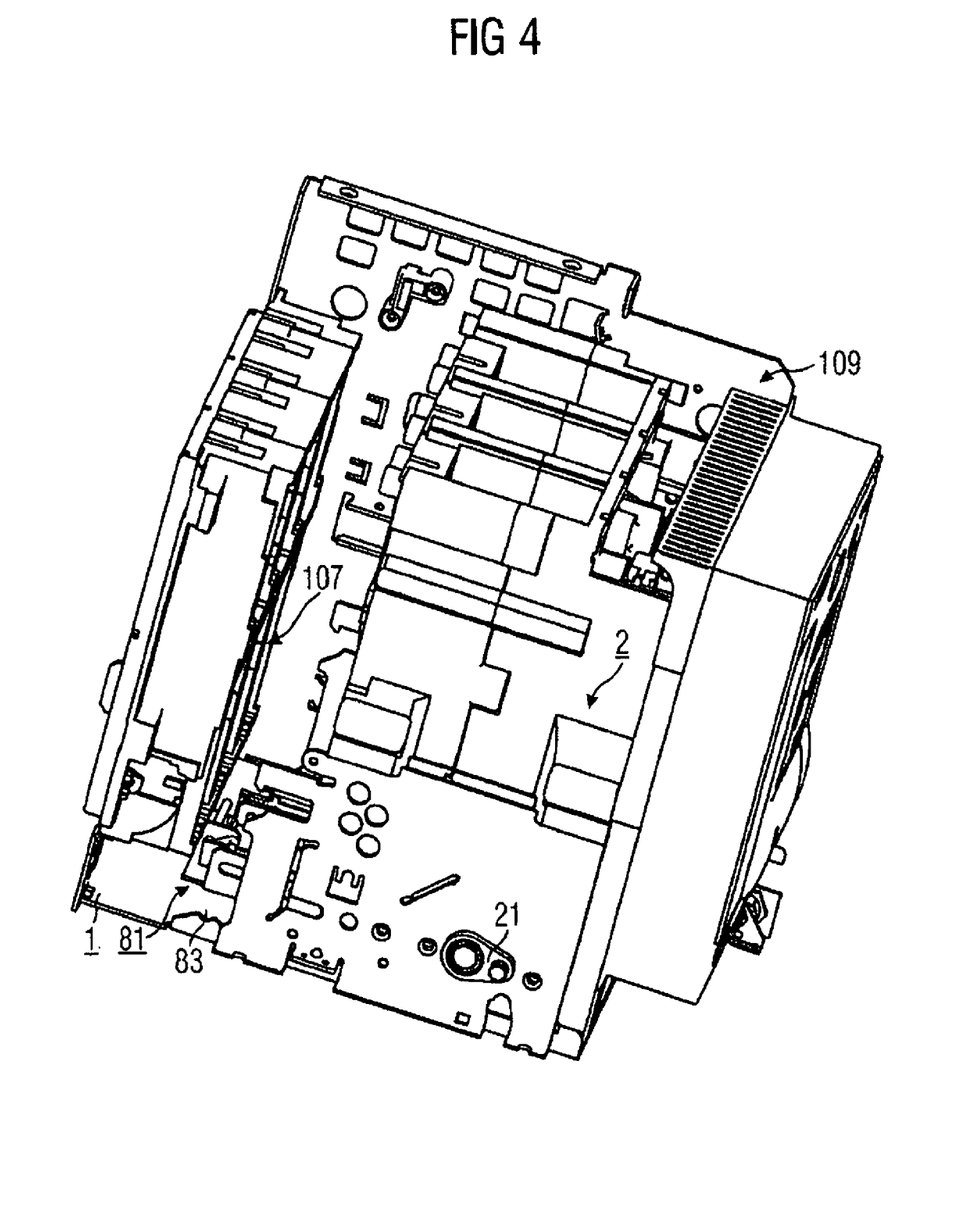
FIG. 4 shows a perspective illustration of the withdrawable rack with the locking device according to an embodiment of the invention which is arranged beneath the low-voltage circuit breaker on the bottom of the withdrawable rack.

As shown in FIG. 4, the locking device 81 according to an embodiment of the invention is fixed beneath the low-voltage circuit breaker 2 to the bottom of the withdrawable rack 1.

Figure 5:
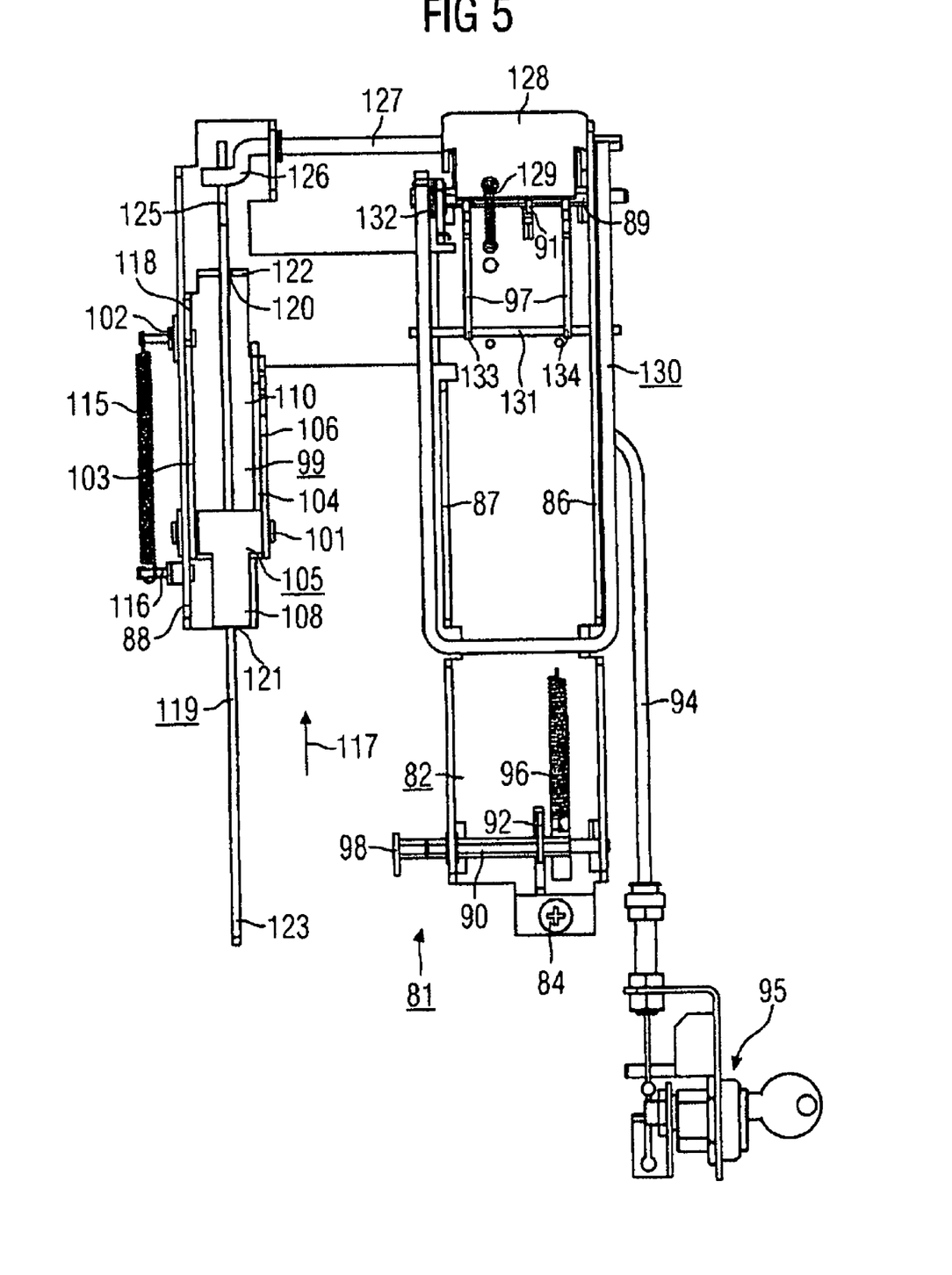
FIG. 5 shows a plan view of the locking device according to an embodiment of the invention.
Figure 6:
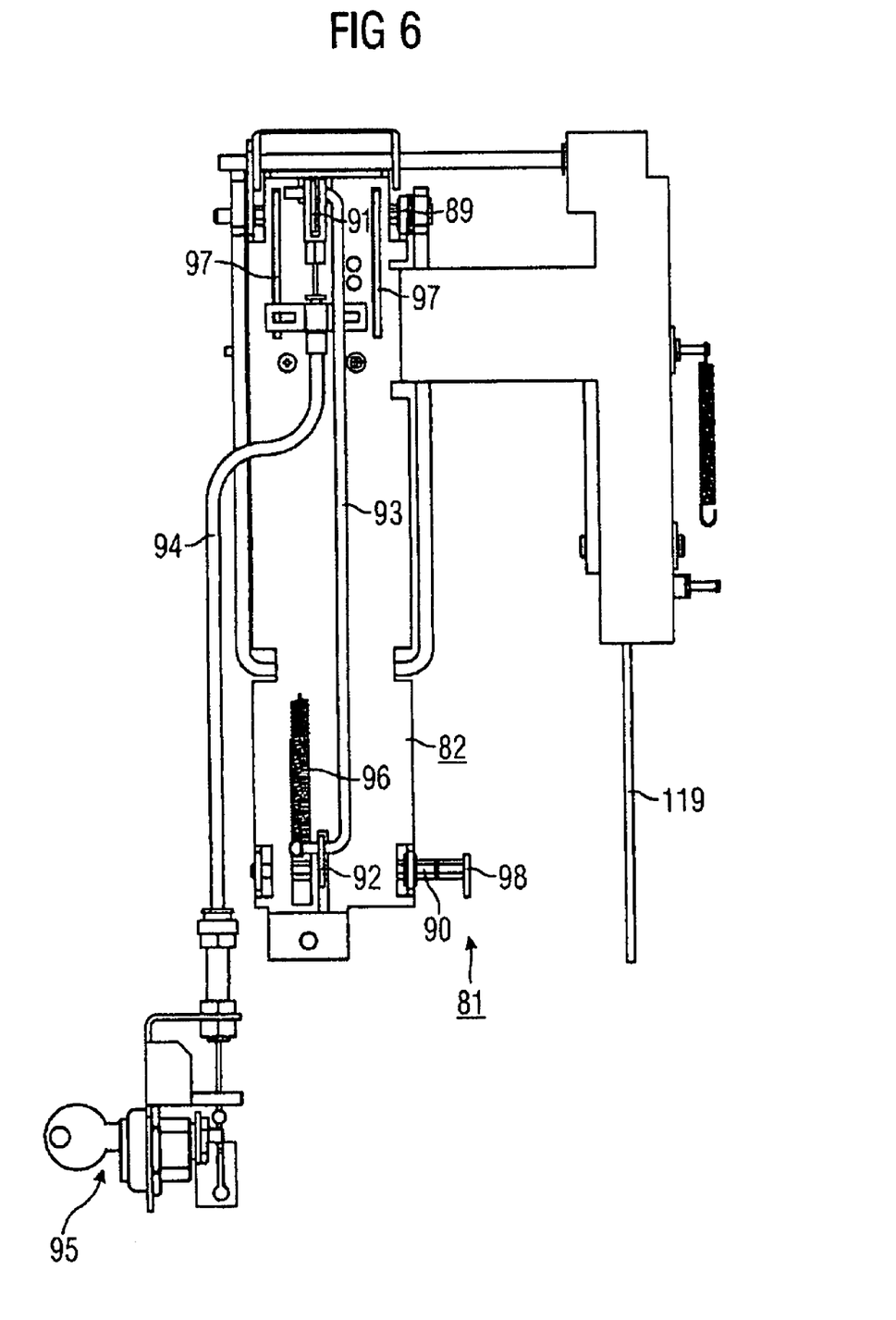
FIG. 6 shows the locking device according to an embodiment of the invention with a view of its underside.

As shown in FIGS. 5 and 6, the locking device 81 has a bearing plate 82, which, on one side, with a bent-back portion (not visible in the figures) passes through the bottom 83 of the withdrawable rack and which, on its opposite side, is fixed to the bottom 83 of the withdrawable rack by way of a fixing device 84 in the form of a screw. The bearing plate 82 has supporting faces 86, 87, 88, which are bent back at right angles to its bottom face 85 and are used for holding and guiding further elements of the locking device.

For example, two hexagon bolts 89, 90 are mounted in rotatable fashion on a first bent-back supporting face 86 and a second bent-back supporting face 87, in each case one lever 91, 92 being held such that it is fixed against rotation on said hexagon bolts 89, 90. The two levers 91, 92 are connected by way of a rod assembly 93. A cable pull 94, which can be actuated by way of a further cylinder lock 95, acts on one lever 91. The rod assembly 93 is loaded by a second resetting spring 96, which holds the two levers 91, 92 and therefore the two bolts 89, 90 in a rest position when the cylinder lock 95 is unlocked.

While a device 97 for querying the position of the switch in the form of two stop levers is held such that it is fixed against rotation on one of the hexagon bolts 89, the other of the two levers 92 is provided with a device 98 for blocking the actuating shaft 14 in the form of a cam disk. In this case, the cam disk acts in the direction of the arrow 71 on the second arm 65 of the second actuating element 60 (cf. FIG. 3). The device 97 for querying the position of the switch and the device 98 for blocking the actuating shaft 14 in an open position, which corresponds to the unactuated OFF position of the second actuating element 60, are located in the rest position of the rod assembly 93.

A carriage 99, which is bent in the form of a U, is held displaceably on the third bent-back supporting face 88. For this purpose, the third supporting face 88 is provided with a slot 100 (cf. FIG. 7), in which two bolts 101, 102, which are connected to the carriage 99, are guided displaceably. In this case, one of the two bolts 101 passes through the two lateral guide faces 103, 104, which run parallel to the third supporting face, of the carriage, which is bent in the form of a U. A restraining device 105 in the form of a two-armed lever is mounted pivotably on this bolt 101.

In this case, one lever arm 106 extends in the form of a bent-back portion which runs parallel to the guide faces of the carriage bent in the form of a U (cf. FIG. 8) in the direction of a rear wall 107 of the withdrawable rack 1 (cf. FIG. 4). The second lever arm 108, which extends in the direction of the open side 109 (cf. FIG. 4) of the withdrawable rack 1 in a plane which runs substantially parallel to the bottom 110 of the carriage bent in the form of a U has a bent-back portion 111, which points in the direction of the bottom 110, at its free end (cf. FIG. 8). Two bearing arms 112, 113 (cf. FIG. 8), which run parallel to the guide faces of the carriage bent in the form of a U and have a distance from one another such that the outer width of the restraining device is matched to the inner width of the carriage bent in the form of a U, are used for pivotably mounting the restraining means 105 on the bolt 101.

A third resetting spring 114 in the form of a helical compression spring is supported between the bottom 110 of the carriage 99 and the free end of the first lever arm 106. The second 102 of the bolts acts as a first abutment for a fourth resetting spring 115, which is in the form of a tension spring and whose second abutment is formed by a pin 116. In this case, the pin 116 protrudes away from the outwardly pointing, third supporting face 88, mounted in front of the first bolt 101 in the insertion direction 117. The guide face 103, which is opposite this third supporting face 88, of the carriage 99 bent in the form of a U has a tab 118, which protrudes into the movement path of the low-voltage circuit breaker 2 and is used for guiding the carriage 99 along with the switch when a specific insertion position is reached.

A sensing device 119 in the form of a further two-armed lever is mounted pivotably on the first bolt 101 between the carriage 99 and the restraining device 105. This sensing device 119 serves the purpose of sensing the position of the actuating element 47 (of the blocking slide). Two guide slits 120, 121 are used for axially positioning the sensing element 119, of which guide slits a first 120 is provided in a rear bent-back portion 122 of the carriage 99 and the second 121 is provided in the second lever arm 108 of the restraining device 105 and in the bent-back portion 111 thereof.

While the upwardly pointing edge of the end of one lever arm 123 of the sensing means 119 is opposite an actuating face 124 (cf. FIG. 9) of the first actuating element 47 (blocking slide), a bow 126 of a lever mechanism 127 bears against the upwardly pointing edge of the free end of the other lever arm 125. A first blocking device 128 in the form of a blocking flap, which is bent in the form of a U, is held such that it is fixed against rotation on the lever mechanism 127. The blocking flap is held by a fifth resetting spring 129 in a rest position, in which it covers the two stop levers which form the means for querying the position of the switch 97 and, as a result, holds them in their open position (cf. FIG. 9).

The hexagon bolt 89 bears, in addition to the device 97 for querying the position of the switch, a second blocking means 130 in the form of a frame-like flap, which bears against retaining tabs 133, 134 of the two stop levers by way of an edge 131 under the force of a second prestressing spring 132.

Figure 7:
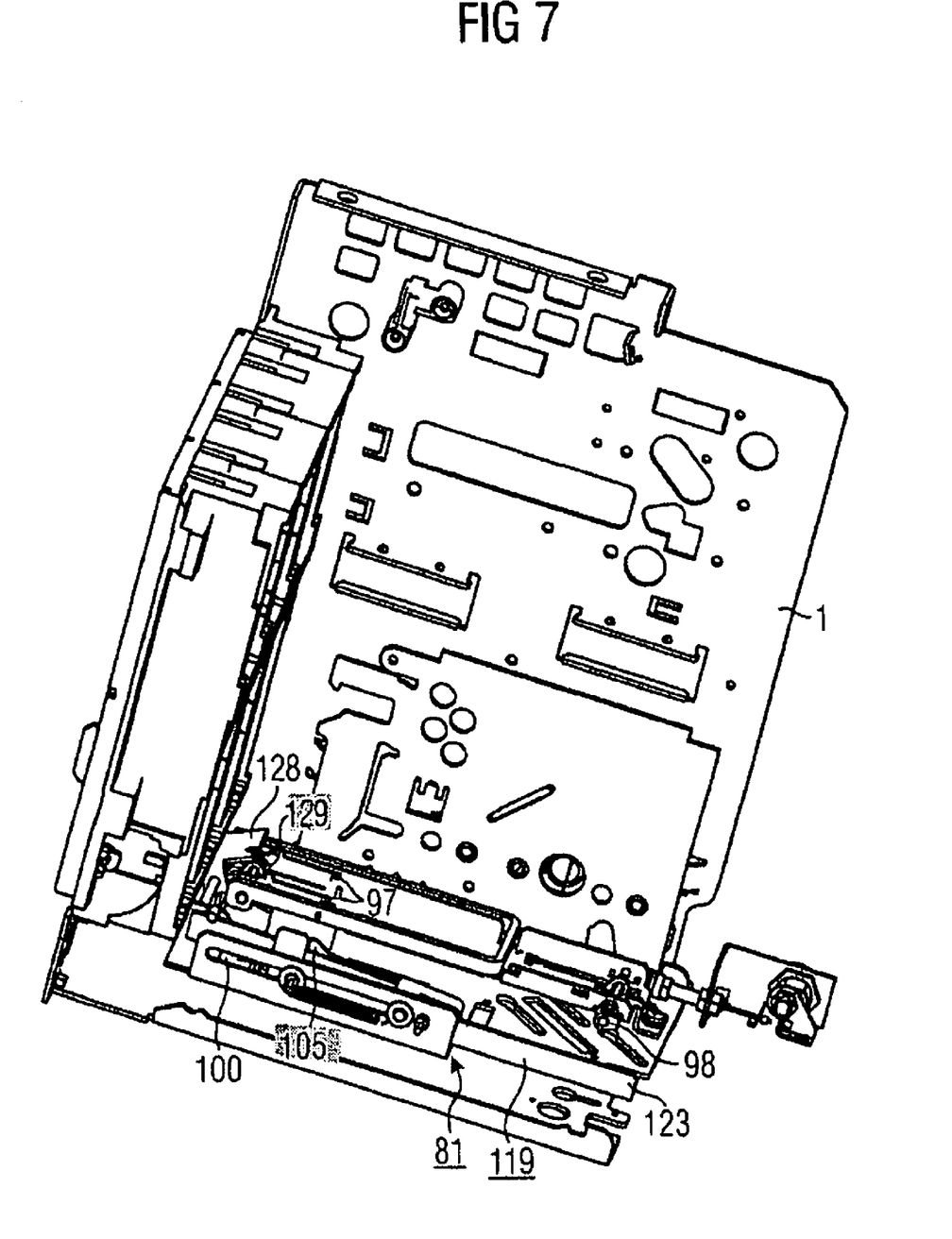
FIG. 7 shows the withdrawable rack with the locking device in an unlocked first position with the switch removed from the withdrawable rack.

FIG. 7 shows the locking device 81 in its unlocked release position with the switch removed from the withdrawable rack. In this case, the device 98 (cam disk) for blocking the actuating shaft 14 is located in its OFF position, and the device 97 (stop levers) for querying the position of the switch 97 is located in its open position. Owing to the fact that there is no low-voltage circuit breaker in the withdrawable rack, there is also no first actuating element (blocking slide) acting on the one lever arm 123 of the sensing device 119.

In this case, the forces of the fifth resetting spring 129, which acts on the first blocking device 128 (blocking flap), and of the third resetting spring 114 (cf. FIG. 5), which acts on the restraining device 105, are dimensioned such that the first lever arm 123 of the sensing device 119 is pivoted downwards into a first position corresponding to the blocking position of the first actuating element 47 (blocking slide) and the first blocking device 128 (blocking flap) is therefore pivoted upwards such that the device 97 for querying the position of the switch is released such that it can be moved into its blocking position.

Figure 8:
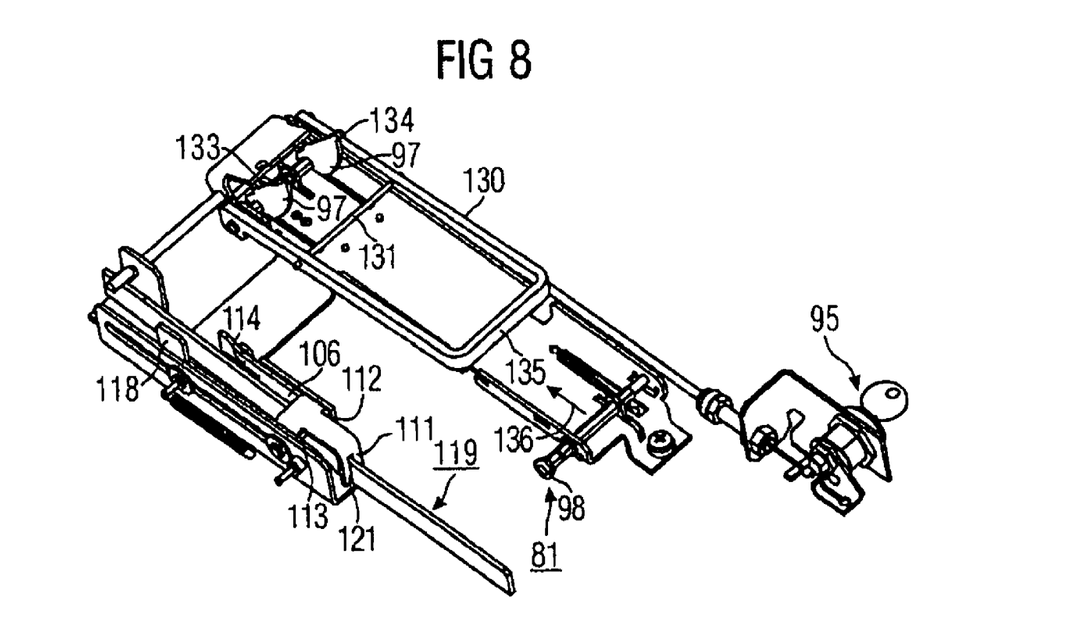
FIGS. 8 to 11 show further characteristic positions of the locking device.

FIG. 8 shows the locking device 81 in its locked locking position with the switch removed from the withdrawable rack. In contrast to the position as illustrated in FIG. 7, in this case the device 97 for querying the position of the switch (stop levers) is moved into its blocking position by the actuation of the cylinder lock 95. In this case, the second blocking device 130 (frame-like flap) is released by the retaining tabs 133, 134 of the stop levers and is therefore pivoted upwards such that a front edge 135 protrudes into the movement path 136 of the switch which points in the insertion direction. Once a switch has been removed from the withdrawable rack, renewed insertion of a switch is therefore prevented when the locking device is locked. In this locking position, the device 98 for blocking the actuating shaft 14 is located in a position in which the actuating element 60 is raised such that the blocking pawl 52 is located in its ON position and the shank 22 is stopped in its axial direction.

Figures 11, 12:
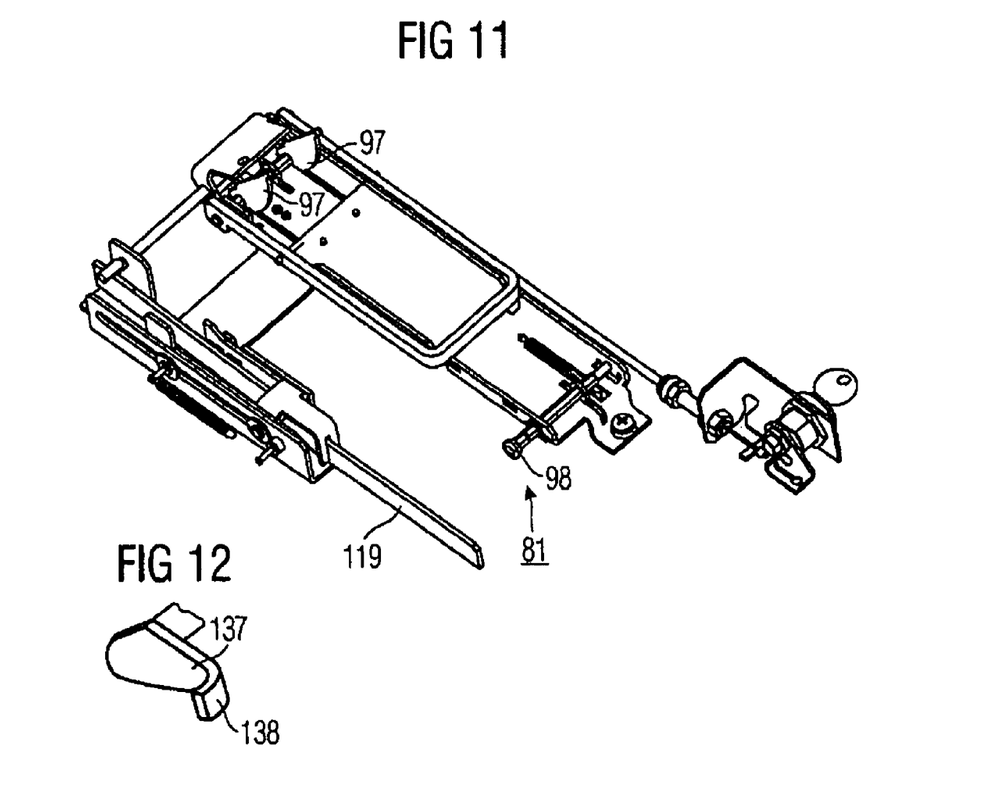
FIG. 12 shows a particular configuration of a device for blocking the actuating shaft.

As an alternative to the second blocking device, a third blocking device, which is coupled to the device 97 for querying the position of the switch, can be provided such that, when the locking device is located in the locking position, removal of a switch from the withdrawable rack is also prevented. For this purpose, as shown in FIG. 12, a bent-back portion 138 is also provided on the device 137 (in the form of a cam disk) for blocking the actuating shaft, which bent-back portion 138 runs at right angles to the movement path of the switch and, when the switch is located in the isolating position in the withdrawable rack and the locking device is located in its locking position, is opposite a stop face 139 of the second actuating element 60 and therefore blocks removal of the switch.

When the locking device is located in its locking position, the same bent-back portion 138 is opposite a stop face 140 (cf. FIG. 3) of the housing 16 of the traveling drive 15 of a switch 1 if an attempt is made to insert the switch 1 into the withdrawable rack when the locking device is located in its locking position and therefore prevents the insertion.

Figure 9:
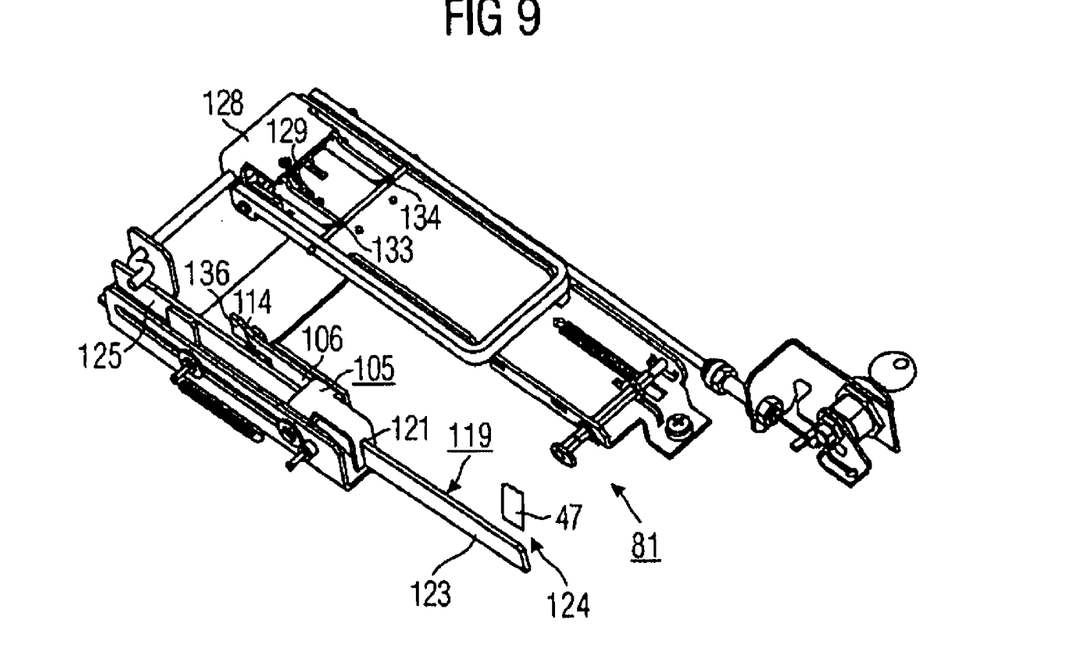

FIG. 9 shows the locking device 81 in its release position, in which it cannot be locked since the low-voltage circuit breaker is located in an intermediate position outside of the preferred isolating position. In this intermediate position, the first actuating element 47 is in its free position, i.e. in its upwardly displaced position, since the preferred position, namely the isolating position of the switch in the withdrawable rack, has not yet been reached. The lever arm 106 of the restraining device 105 is pivoted by the inserted switch and the spring force of the third resetting spring 114 is blocked such that the first blocking device 128 and the lever arm 125 are held in their rest position under the force of the fifth resetting spring 129, in which rest position the device 97 for querying the position of the switch (stop levers) is stopped in its open position.

A cam 136 is formed on the lever arm 106 of the restraining device 105 such that the sensing device 119 and the first actuating element 47 (blocking slide) are reliably associated with one another irrespective of the position of the first actuating element 47.

Figure 10:
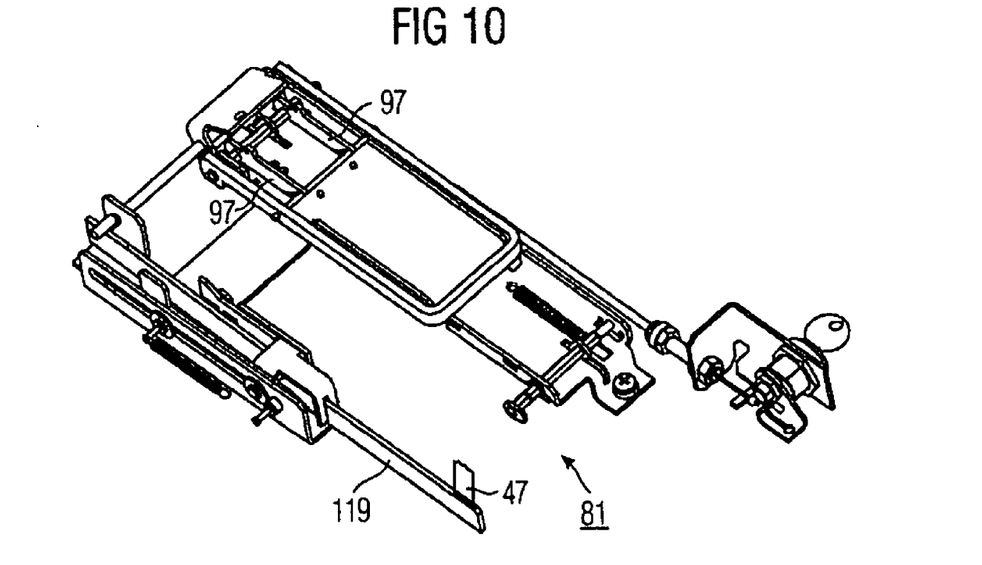

FIG. 10 shows the locking device 81 with the switch located in the isolating position in its unlocked release position, in which, however, the device 97 for querying the position of the switch is released such that it can be moved into its blocking position. This release is brought about by the first actuating element 47 (blocking slide) being moved into its blocking position, i.e. by the blocking slide being lowered. Such lowering of the blocking slide, as has already been explained, is only possible, however, if the crank arm 27 has been recessed completely into the accommodating pocket 12 and therefore an actuation of the actuating crank 13 is prevented (cf. FIG. 2).

FIG. 11 shows the locking device 81 with the switch located in the isolating position in its locking position, in which the device 97 for querying the position of the switch is moved from its open position (cf. FIG. 10) into its blocking position. In its blocking position, the device 97 protrudes into the movement path of the switch, with the result that a further displacement of the switch beyond its isolating position in the direction of the test and operating position is stopped.

In this case too, the blocking pawl 52 is caused to move into its ON position owing to the rotation of the device 98 (cam disk) for blocking the actuating shaft, with the result that the shank 22 is stopped in its axial direction in this case, too.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A locking device for an electrical switch, displaceably guidable in a withdrawable rack by converting a rotation movement, exerted by way of an actuating crank into a rotation of a traveling shaft by way of an actuating shaft, the actuating shaft and the traveling shaft are at right angles with respect to one another and movable, with the switch located in a position, from a release position, in which the switch is displaceable in the withdrawable rack, into a locking position, the locking device in the locking position blocking a displacement of the switch in the withdrawable rack in a direction, and the actuating shaft being operatively connected to the actuating crank by being fitted onto an end of the actuating crank, wherein the locking device is only movable into the locking position if the actuating crank is blocked against actuation, the actuating crank remaining in operational contact with the actuating shaft when the locking device is in the release position and in the locking position, the locking device further including a querying device that queries the position of the switch, the querying device only being movable from an open position into a blocking device position if the actuating crank is blocked against actuation, and a blocking device that blocks the actuating shaft, the blocking device being coupled to the querying device and being provided to block the displacement of the switch, an actuating element, movable from a free position into a blocking position, being provided to block the actuation of the actuating crank;

a sensing device, movable from a first position corresponding to the blocking position of the actuating element into a second position corresponding to the free position of the actuating element, for sensing the position of the actuating element; and a first blocking device, coupled to the sensing device by a coupling section, for blocking the querying device, the first blocking device only releasing the querying device such that it can be moved into its blocking position if the actuating element is located in its blocking position.

2. The locking device as claimed in claim 1, wherein the sensing device is mounted on a carriage, displaceable by the switch.

3. The locking device as claimed in claim 2, further comprising:

a restraining device that, with the switch removed from the withdrawable rack, keeps the sensing device in its first position, corresponding to the blocking position of the actuating element.

4. The locking device as claimed in claim 1, further comprising:

a restraining device that, with the switch removed from the withdrawable rack, keeps the sensing device in its first position, corresponding to the blocking position of the actuating element.

5. The locking device as claimed in claim 1, wherein the querying device is stoppable in its blocking position.

6. The locking device as claimed in claim 5, further comprising:

a locking cylinder, coupled to the querying device by a cable pull, to stop the querying device in its blocking position.

7. The locking device as claimed in claim 5, further comprising:
a second blocking device that, with the querying device stopped in its blocking position and once the switch has been removed from the withdrawable rack, pivots into the movement path of the switch which points in the direction of the position of the switch.

8. The locking device as claimed in claim 7, further comprising:
a third blocking device that, when the querying device is moved into its blocking position, pivots into the movement path of the switch.

9. A locking device as claimed in claim 1, wherein the locking device is fixedly connected to the withdrawable rack.

10. The withdrawable rack as claimed in claim 9, wherein the locking device includes a bearing plate for arranging the locking device on the withdrawable rack beneath the switch.

11. The locking device as claimed in claim 1, wherein the querying device is stoppable in its blocking position.

12. A locking device for an electrical switch, displaceably guidable in a withdrawable rack by converting a rotation movement, exerted by way of an actuating crank, that includes a grip piece at first end and a hollow shank at a second end, into a rotation of a traveling shaft by way of an actuating shaft, the actuating shaft and the traveling shaft are at right angles with respect to one another and movable, with the switch located in a position, from a release position, in which the switch is displaceable in the withdrawable rack, into a locking position, the locking device in the locking position blocking a displacement of the switch in the withdrawable rack in a direction, and the actuating shaft being rotatably locked to the actuating crank at the hollow shank, the locking device being movable into the locking position only upon the actuating crank being blocked against actuation, the actuating crank remaining in operational contact with the actuating shaft when the locking device is in the release position and in the locking position, the locking device further including
a querying device that queries the position of the switch, the querying device only being movable from an open position into a blocking position if the actuating crank is blocked against actuation,
a blocking device that blocks the actuating shaft, the blocking device being coupled to the querying device and being provided to block the displacement of the switch, an actuating element, movable from a free position into a blocking position, being provided to block the actuation of the actuating crank;
a sensing device, movable from a first position corresponding to the blocking position of the actuating element into a second position corresponding to the free position of the actuating element, for sensing the position of the actuating element; and
a first blocking device, coupled to the sensing device by a coupling section, for blocking the querying device, the first blocking device only releasing the querying device such that it can be moved into its blocking position if the actuating element is located in its blocking position.

13. A locking device as claimed in claim 12, wherein the locking device is fixedly connected to the withdrawable rack.

14. A locking device for an electrical switch, the switch being located in a position, from a release position, in which the switch is displaceable in a withdrawable rack, the locking device comprising:
an actuating shaft housed in a traveling device, the actuating shaft displaceably guiding the switch in the withdrawable rack, the switch being located in a position, from a release position, in which the switch is displaceable in the withdrawable rack, into a locking position, the locking device in the locking position blocking a displacement of the switch in the withdrawable rack in a direction;
a querying device that queries the position of the switch, the querying device only being movable from an open position into a blocking position if the actuating crank is blocked against actuation,
a blocking device that blocks the actuating shaft, the blocking device being coupled to the querying device and being provided to block the displacement of the switch, an actuating element, movable from a free position into a blocking position, being provided to block the actuation of the actuating crank;
a sensing device, movable from a first position corresponding to the blocking position of the actuating element into a second position corresponding to the free position of the actuating element, for sensing the position of the actuating element;
a first blocking device, coupled to the sensing device by a coupling section, for blocking the querying device, the first blocking device only releasing the querying device such that it can be moved into its blocking position if the actuating element is located in its blocking position; and
an actuating crank, that includes a grip piece at a first end and a hollow shank at a second end, the actuating crank being housed in the traveling device and operatively connected to a traveling shaft by the actuating shaft, the actuating shaft and the traveling shaft being at right angles with respect to one another, the locking device being movable into the locking position only upon the actuating crank being blocked against actuation, wherein
the actuating crank being rotatably locked to the actuating shaft at the hollow shank and remaining in operational contact with the actuating shaft when the locking device is in the release position and in the locking position.

15. A locking device as claimed in claim 14, wherein the locking device is fixedly connected to the withdrawable rack.

* * * * *